(12) United States Patent  
Smith

(10) Patent No.: US 8,839,117 B1  
(45) Date of Patent: Sep. 16, 2014

(54) INTERNET BROWSER

(75) Inventor: Darren Smith, Sammamish, WA (US)

(73) Assignee: Nintendo of America Inc., Redmond, WA (US)

( * ) Notice: Subject to any disclaimer, the term of this patent is extended or adjusted under 35 U.S.C. 154(b) by 835 days.

(21) Appl. No.: 12/545,904

(22) Filed: Aug. 24, 2009

Related U.S. Application Data

(60) Provisional application No. 61/091,461, filed on Aug. 25, 2008.

(51) Int. Cl.  
*G06F 3/048* (2013.01)  
*H04N 1/00* (2006.01)

(52) U.S. Cl.  
CPC .................... *H04N 1/00973* (2013.01)  
USPC .......................... 715/745; 715/811

(58) Field of Classification Search  
USPC ....................................................... 715/747  
See application file for complete search history.

(56) References Cited

U.S. PATENT DOCUMENTS

| | | | |
|---|---|---|---|
| 6,915,328 B2 | 7/2005 | Turnbull | |
| 6,957,390 B2 * | 10/2005 | Tamir et al. | 715/744 |
| 7,461,353 B2 | 12/2008 | Rohrabaugh et al. | |
| 7,574,653 B2 | 8/2009 | Croney et al. | |
| 7,584,423 B2 | 9/2009 | Rohrabaugh et al. | |
| 8,090,794 B1 * | 1/2012 | Kilat et al. | 709/217 |
| 2004/0260767 A1 * | 12/2004 | Kedem et al. | 709/203 |
| 2005/0193053 A1 * | 9/2005 | Kendall et al. | 709/200 |
| 2006/0031760 A1 | 2/2006 | Jacobs | |
| 2006/0184614 A1 | 8/2006 | Baratto et al. | |
| 2008/0174570 A1 * | 7/2008 | Jobs et al. | 345/173 |
| 2008/0215966 A1 | 9/2008 | Suarez | |
| 2009/0293018 A1 * | 11/2009 | Wilson et al. | 715/811 |

* cited by examiner

*Primary Examiner* — Peiyong Weng  
(74) *Attorney, Agent, or Firm* — Nixon & Vanderhye P.C.

(57) ABSTRACT

A central computer server keeps a record of a set of display parameters related to particular web pages visited by a web browser, and sends this information to the browser for displaying a particular web page according to the received information from the server.

12 Claims, 8 Drawing Sheets

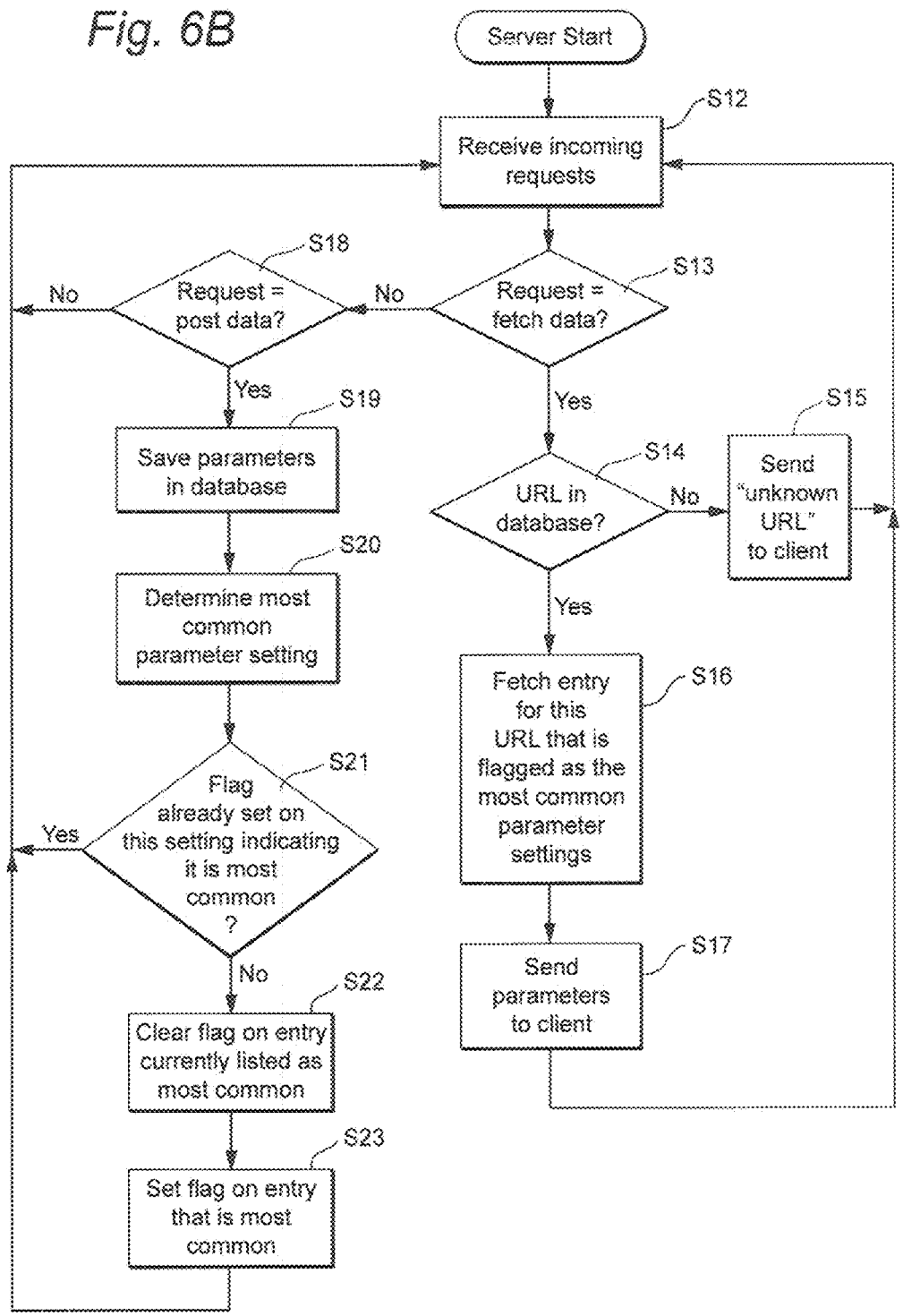

INTERNET BROWSER

CROSS-REFERENCES TO RELATED APPLICATIONS

This application claims the benefit of priority from provisional application No. 61/091,461 filed Aug. 25, 2008, incorporated herein by reference.

STATEMENT REGARDING FEDERALLY SPONSORED RESEARCH OR DEVELOPMENT

None.

FIELD

The technology herein relates to a method and a system for browsing the Internet using a game platform or other device. In more detail, the technology herein relates to a browser on the user's game platform or other device, which in conjunction with a remote or local server, modifies parameters related to a page requested from the user based on past history for better viewing.

BACKGROUND AND SUMMARY

Viewing web sites on the World Wide Web has become extremely popular in recent years. The easy access to an almost limitless amount of information is very appealing to users of all ages. Typically, user machines such as personal computers are connected to distributed remotely located web servers via the Internet. FIG. 1 shows a conventional network where a user machine 1 can connect to remote web servers 2 via Internet 3. Although two user machines 1 and three remote servers are depicted in FIG. 1, it should be understood that the network may include multiple ones of these components. For example, the network may include multiple, logically connected remote web servers 2 available to provide the user machine 1 with internet browsing capabilities.

Web sites are typically stored on a web server and include textual and graphical information formatted according to predetermined protocols. For example, the protocol may be static, e.g., HTML ("Hyper Text Markup Language") having fixed tag semantics and a fixed tag set, or dynamic, e.g., SGML ("Standard Generalized Markup Language") having dynamic tag sets defined by ISO 8879. Web sites are then interpreted by a user program, such as, for example, Internet Explorer, manufactured by Microsoft Corporation, or embedded browsers such as Opera, which resides on the user computer or other device.

When a user wishes to browse the Web, the user machine 1, via a web browser 4, transmits a request to access a Uniform Resource Locator ("URL") address corresponding to an HTML page residing on the remote web server 2. The user machine is authenticated by the remote server if needed, and the server prepares and transmits to the user machine the requested HTML page.

Web pages are commonly designed to be displayed on fully capable personal computer displays. Sometimes, however, a display unit that is used in conjunction with a game platform or a non-personal-computer-based device, such as a GPS, PDA, cell phone, etc., may have a different set of display capabilities. This can result in a display that may be blurred, out of position or having the wrong size, thus resulting in a display that does not initially show the most important information on the page due to the reformatting required to fit the content to the display. This mismatch between the fetched web page and the available display capabilities may occur every time the user requests the particular web page, thus forcing the user to adjust display settings (e.g., zoom, scrolls, or other display settings) each time a particular page is accessed.

It would be beneficial to provide a method and a system that adjusts the display parameters of a web browser in accordance with a particular web page and particular viewing capabilities of a browsing appliance, for achieving better consistent viewing of the web page.

The exemplary illustrative technology provided herein is directed to a method and a system for using information related to the characteristics of a particular web page or other publication to set the display characteristics of the display unit for that page.

In one exemplary illustrative non-limiting implementation, an online service for a community of users using a common type of display appliance is provided. Every time any user requests a particular web page, a server determines whether a set of characteristic parameters associated with the particular page, including zoom level, screen coordinates and text size, has been set previously by that or any other user. The server compares the acquired set of parameters with data stored in a history file and requests and provides the page using page parameters that are fitted or optimized for the particular display appliance.

BRIEF DESCRIPTION OF THE DRAWINGS

These and other features and advantages of exemplary illustrative non-limiting implementations will be better and more completely understood by referring to the following detailed description in conjunction with the drawings of which:

FIGS. 6A and 6B show exemplary illustrative non-limiting software flowcharts.

DETAILED DESCRIPTION

Techniques described herein can be performed on any type of display system including a personal computer, a home video game machine, a portable video game machine, a networked server and display, a cellular telephone, a personal digital assistant, or any other type of device or arrangement having display capabilities. One exemplary illustrative non-limiting implementation includes a home video game system such as the Nintendo Wii 3D video game system, a Nintendo DS or other 3D capable interactive computer graphics display system. One exemplary illustrative non-limiting implementation is described below, but other implementations are possible.

Exemplary Video Game Platform

Figure 2:
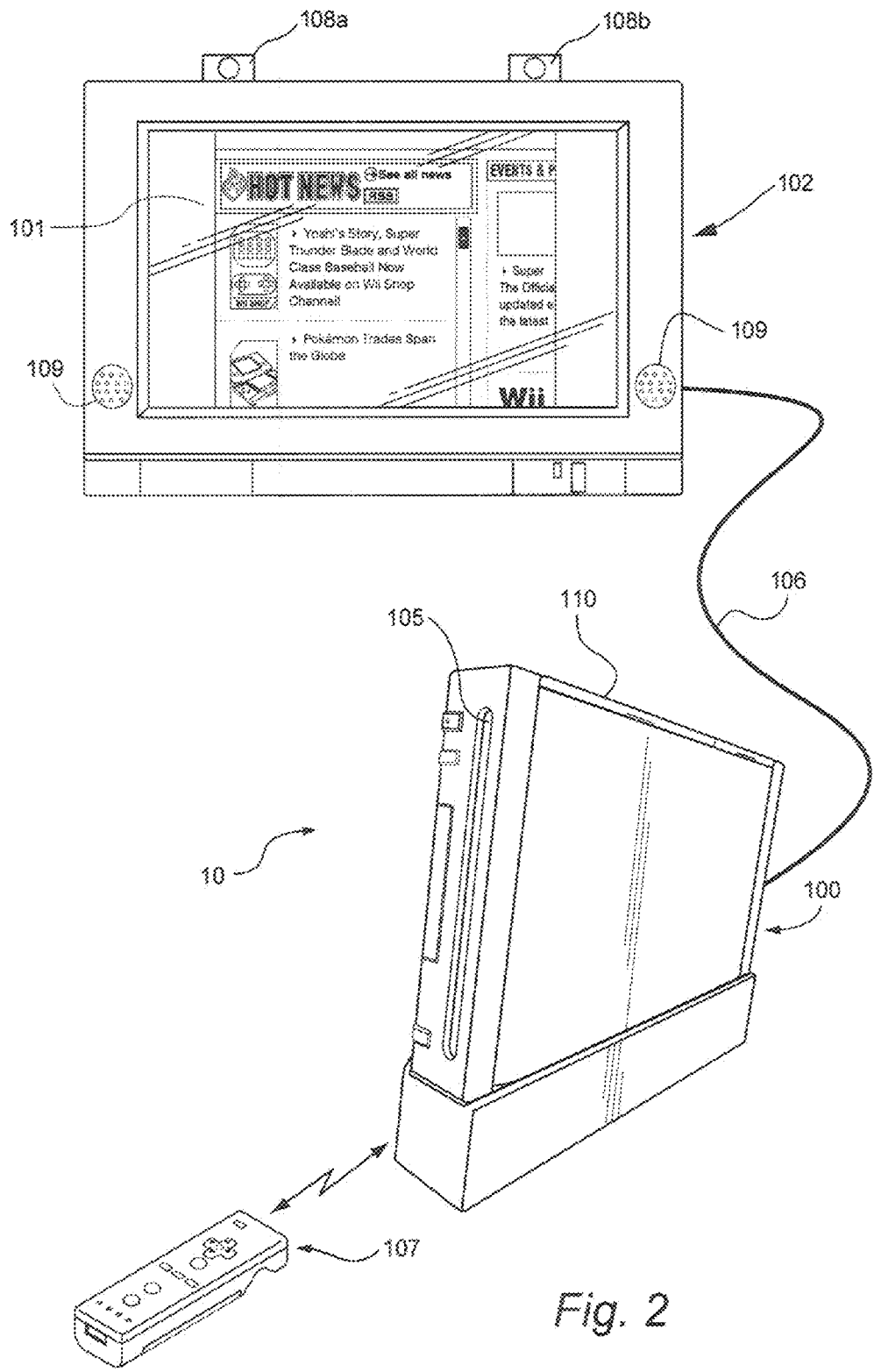
FIG. 2 shows an exemplary external view of a non-limiting system for web browsing.

FIG. 2 shows a non-limiting example game system 10 including a game console 100, a television 102 displaying an exemplary web page, and a controller 107.

Figure 1:
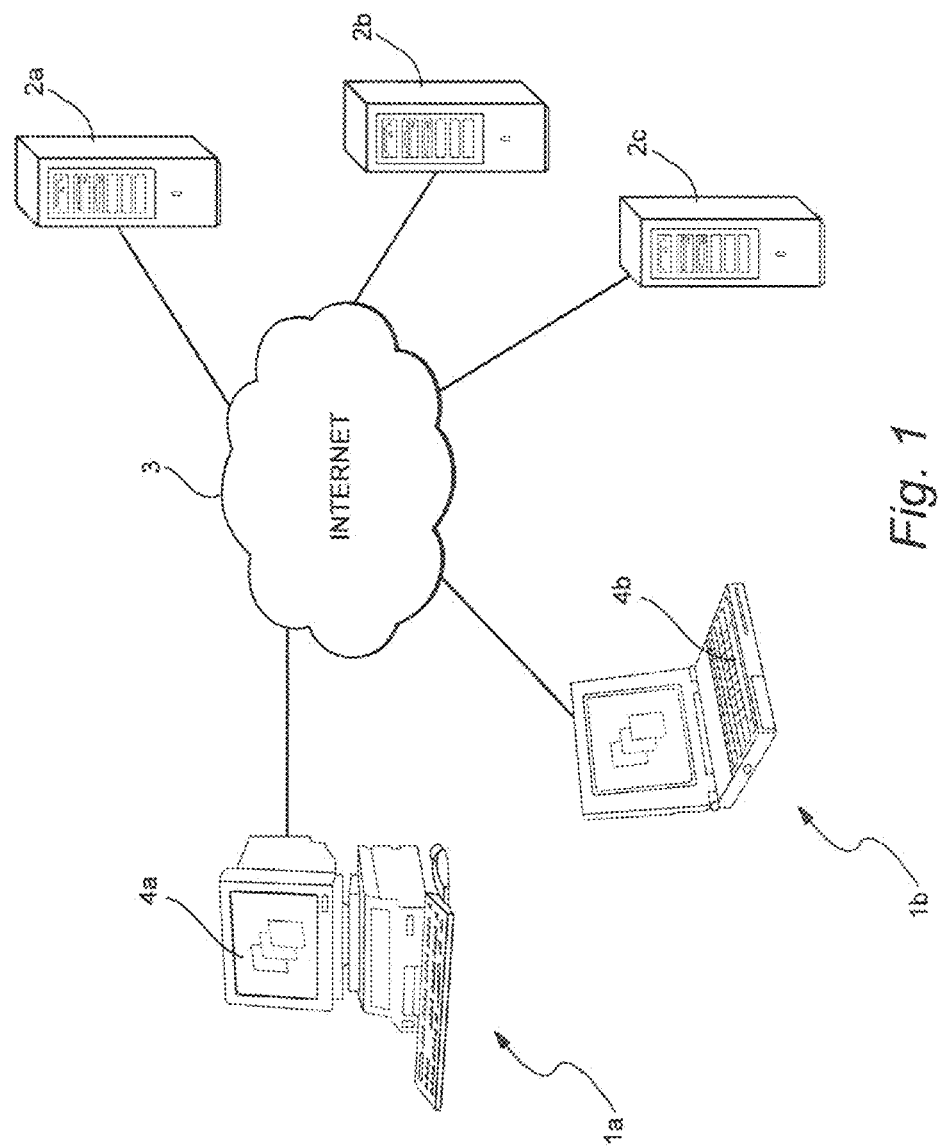
FIG. 1 shows a schematic of a web-based network.

Game console 100 is capable of executing a game program or other application, stored on optical disc inserted into slot 105 formed in housing 110 thereof. The result of the execution of the game program or other application is displayed on display 101 of television 102 to which game console 100 is connected by cable 106. Audio associated with the game program or other application is output via speakers 109 of television 102. While an optical disk is shown in FIG. 1 for use in storing video game software, the application to be executed by console 100 may alternatively or additionally be stored on other storage media such as semiconductor memories, magneto-optical memories, magnetic memories and the like and/or downloaded over a network or by other means.

Controller 107 wirelessly transmits control data to the game console 100. The control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Preferably, a center point between light-emitting devices 108a and 108b is aligned with a vertical center line of television 101. The images from light-emitting devices 108a and 108b can be used to determine a direction in which controller 107 is pointing as well as a distance of controller 107 from display 101. By way of example without limitation, light-emitting devices 108a and 108b may be implemented as two LED modules (hereinafter, referred to as "markers") provided in the vicinity of a display screen of television 102. The markers each output infrared light and the imaging information calculation section of controller 107 detects the light output from the LED modules to determine a direction in which controller 107 is pointing and a distance of controller 107 from display 101 as mentioned above.

Although markers 108a and 108b are shown in FIG. 2 as being above television 100, they may also be positioned below television 100 or in other configurations.

Exemplary Web Browser

In an exemplary embodiment, a video game player is connected to the internet and plays a game online. Furthermore, the user may play games along with other players at other locations. The player's online activities, including connection time, web-browsing and downloading of applications and files may be monitored by a service provider.

Figure 3:
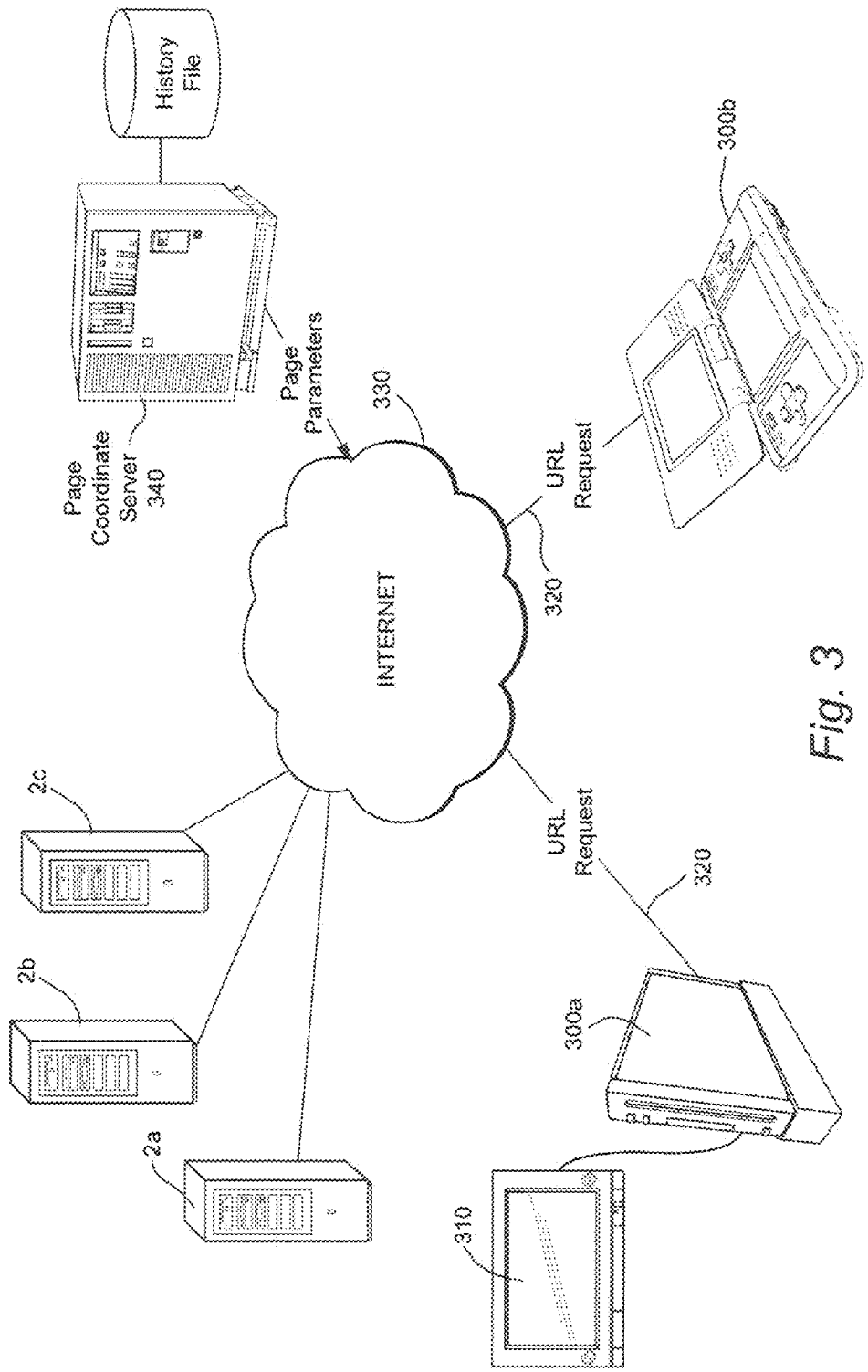
FIG. 3 shows a schematic of a non-limiting exemplary embodiment of a web browsing system using a game console.

As shown in FIG. 3, a plurality of video game consoles 300, each connected to a TV monitor 310 are connected to the internet 330 through an internet server provider (ISP) 320. Each of the players operating the game consoles 300 accesses and registers with a Page Coordinate Server 340 for accessing various web sites available from various web servers 2. The registration results in the establishment of user identification information available to the Page Coordinate Server 340 by methods well known in the art, such as creation of identification tags sent to the video game consoles and stored therein as a cookie.

The player game console computer can communicate with the Page Coordinate Server through the internet network in a known manner. For example, the player game console computer can use an HTML-compatible browser (e.g., Microsoft Internet Explorer™) to specify a link to the central service computer through a Uniform Resource Locator (URL).

The user game console 300 can be coupled to the Page Coordinate Server in ways other than through the internet. For example, telephone wire connection may be used through modulator/demodulators (modem), provided that an identification can be stored on the user's device.

The service provider receives requests for various web pages. Based on a profile history created for a particular user, the service provider sends appropriate page parameters to the user web browser for displaying the particular pages under optimum conditions.

In an exemplary embodiment, a user requests a web page via the web browser residing in the Wii console. This request is received by the Page Coordinate Server, e.g., the Nintendo server. The server determines whether certain parameters associated with the particular page exist in a history file. The parameters may include zoom level set for the page, screen coordinates, text size, or other parameters. Once the server obtains the set of parameters that are appropriate for the page, it passes those parameters on to the user's browser which automatically implements them during the initial rendering of the web page on the display.

The aforementioned page-related parameters are related with each other and affect each other. For example, the zoom level may depend on the font size or the page content. A page that includes dense text may be set for zoom out so that a viewer sees most of the page. A page comprising smaller text size may be zoomed in for better viewing.

Figure 4A:
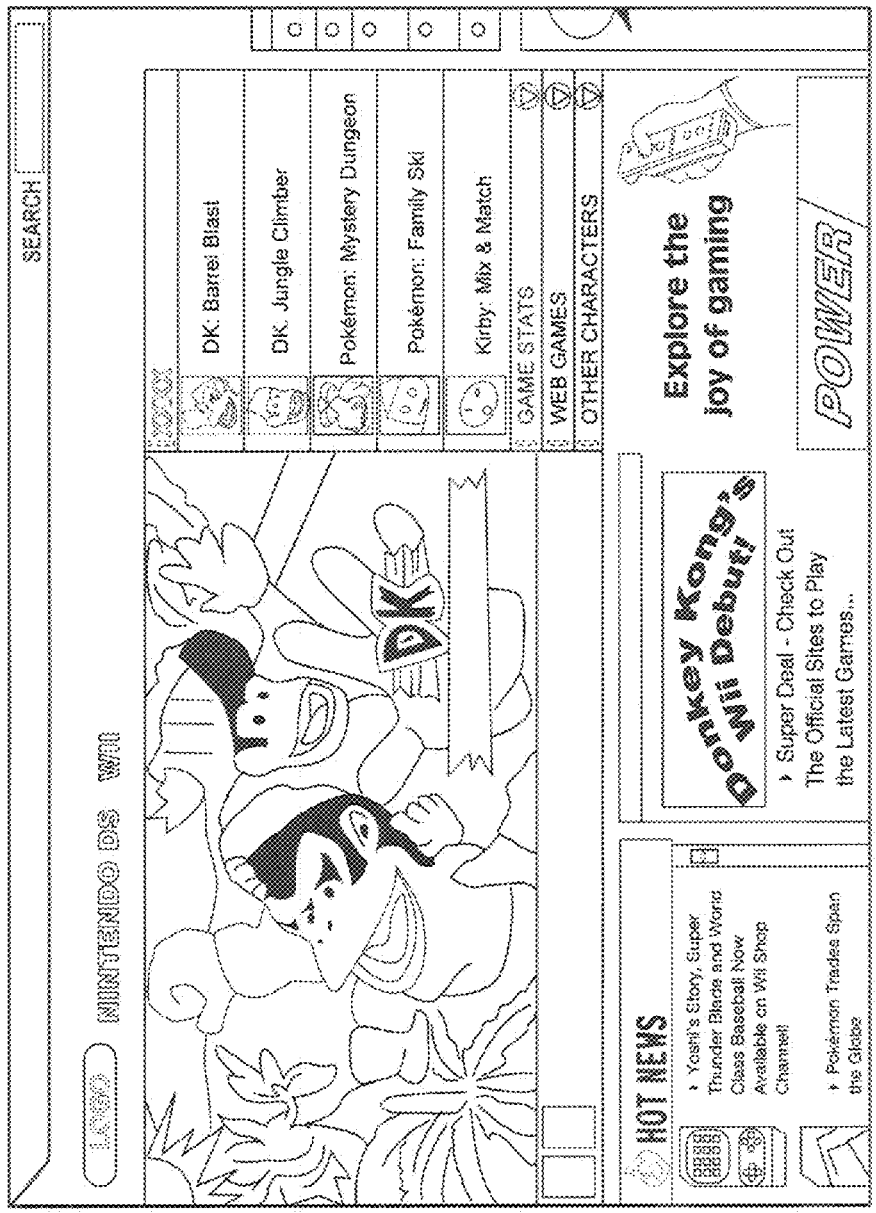
FIGS. 4A and 4B show a web page displayed under a default parameter mode and under parameters tailored for the page, respectively.
Figure 4B:

A difference between displaying a page in a default mode, i.e., using a uniform set of display parameters, and displaying a page based on parameters tailored to the particular page can be seen in FIGS. 4A and 4B. In FIG. 4A, a page is displayed using default parameters for zoom level, text size and positioning. Depending on the page content, the image may be blurred and/or positioned in a way that makes viewing of certain portions more difficult. The page shown in FIG. 4B is displayed using parameters fetched from the server. The zoom level and the x, y coordinates are different from the default values, and they are more appropriate for this particular page.

In another exemplary embodiment, the server may acquire additional information specific for the particular user that may be utilized in conjunction with display parameters for each requested web page. For example, if the user's display unit is a wide screen monitor, or has additional video capabilities, then this information would be provided to the server to appropriately set the display parameters. In addition, certain user preferences may be taken into account and sent to the server. For example, a user may prefer close up views of displayed pages. The preferences of the user are stored in a history file and utilized in the displaying of the web pages.

The capability of the above method to tailor the display characteristics for each requested web page allows the server to position advertisements on the page appropriately. The server would request the type of platform that is accessing it and accordingly would set the display parameters to accommodate the placement of ads. For example, if a device is requesting a web page and a specific part of the page is viewed more prominently than others, then ads would be positioned in that particular area for increased visibility in the device's display environment.

Figure 5:
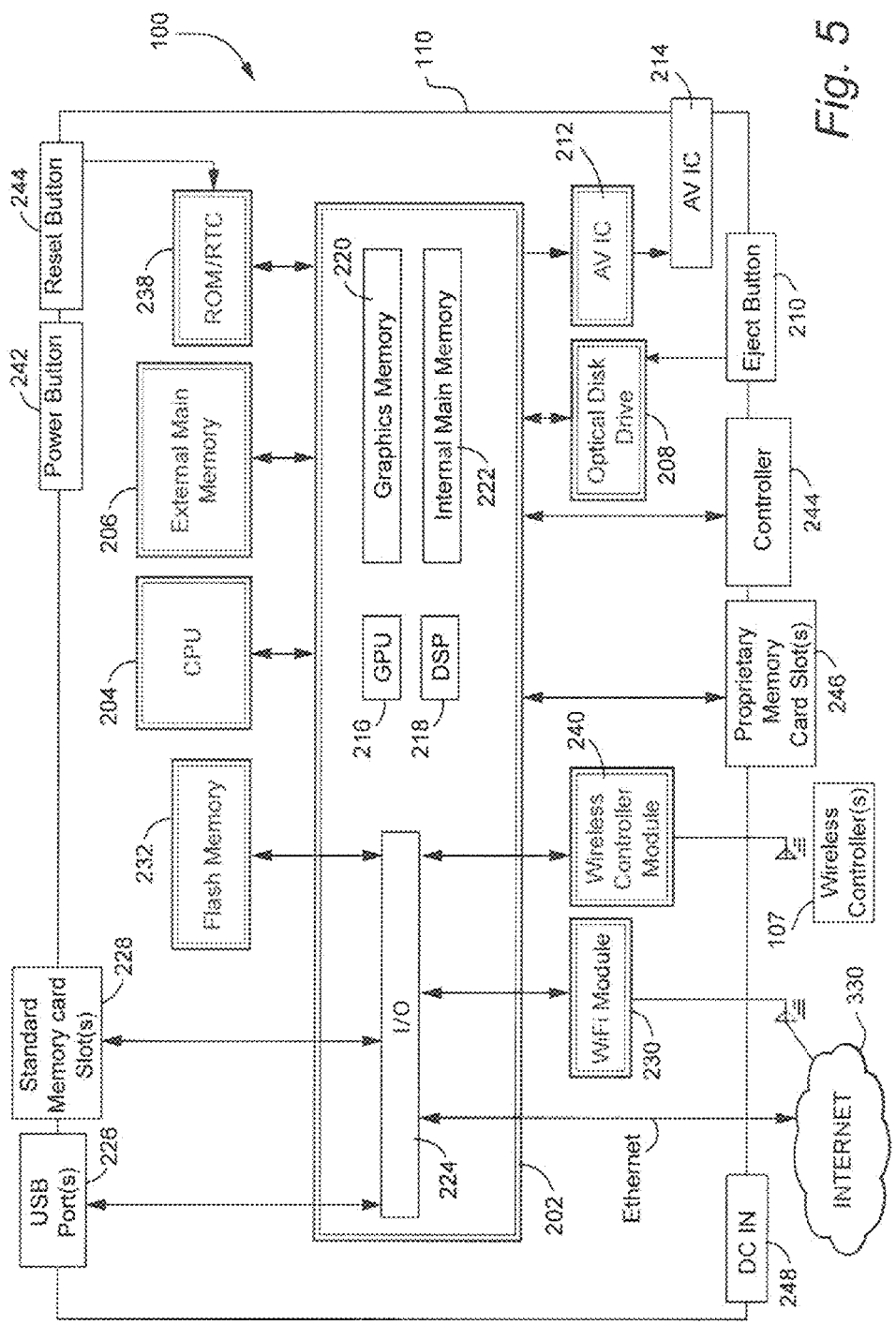
FIG. 5 is a block diagram showing an internal structure of the web browsing system.

With reference to the block diagram of FIG. 5, game console 100 includes a RISC central processing unit (CPU) 204 for executing various types of applications including (but not limited to) video game programs. CPU 204 executes a boot program stored in a boot ROM (not shown) to initialize game console 100 and then executes an application (or applications) stored on optical disc 104 which is inserted in optical disk drive 208. User-accessible eject button 210 provided on housing 110 of game console 100 may be used to eject an optical disk from disk drive 208.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity to Internet 330 for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally used in connection with the family of IEEE 802.11 specifications. However, game console 100 may of course alternatively or additionally use wireless modules that conform with other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some applications may utilize separate right- and left-hand inputs. For such applications, another controller (not shown) may be connected to controller 107 and controller 107 could transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry. By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the consoled off so as to reduce the possibility of inadvertently turn-off. Reset button 244 is used to reset (re-boot) game console 100.

With reference to the flowcharts shown in FIGS. 6A and 6B, an operation of the web browser system adjusting the display characteristics of the web pages is described below. The web browser residing in the user's game platform, e.g., the Wii console, performs the processes shown in FIG. 6A. The Nintendo server receiving a web page request performs the processes shown in FIG. 6B.

Figure 6A:
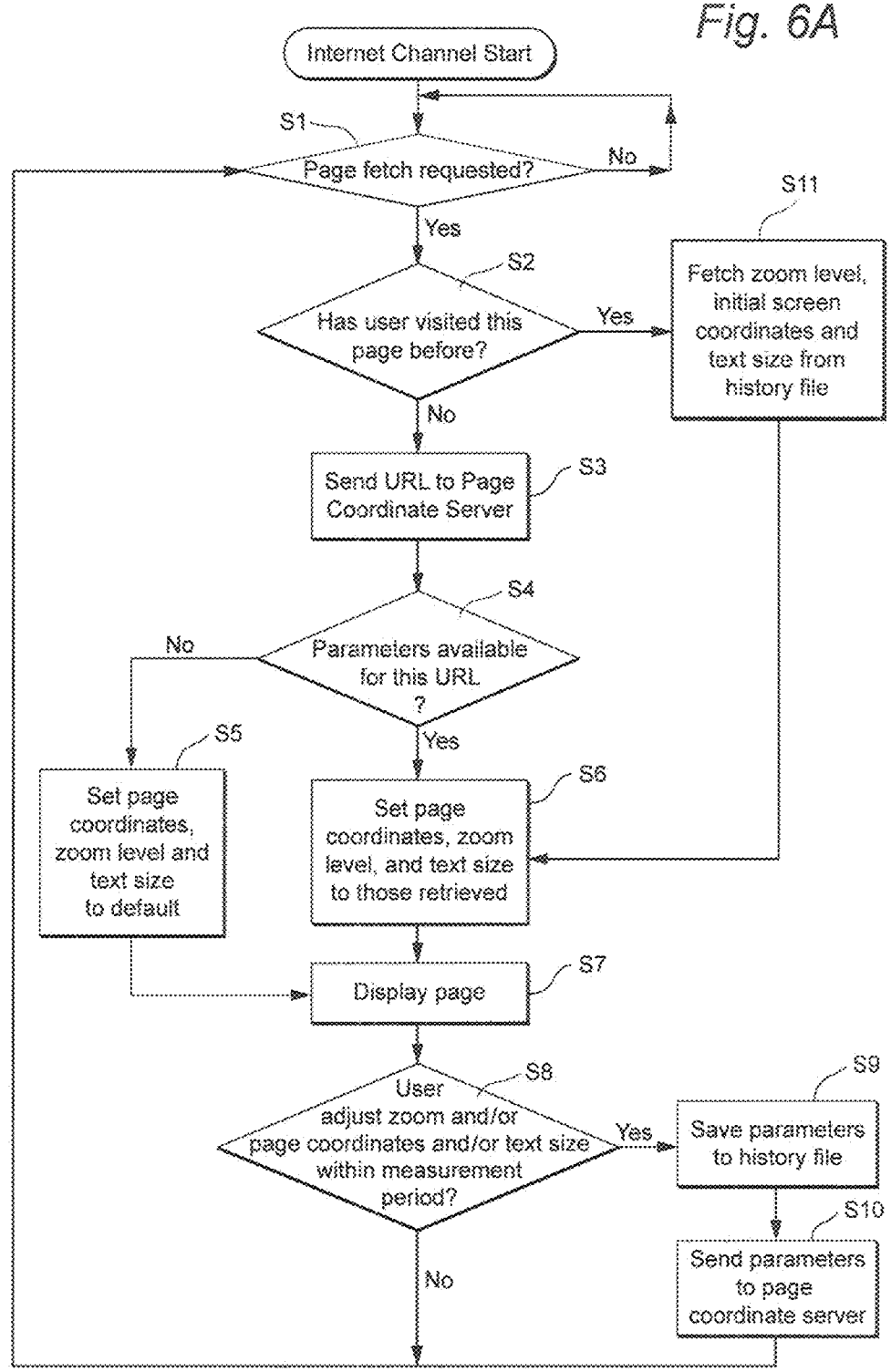

In FIG. 6A, when the web browsing starts, the web browser at step S1 first determines if a request for a web page has been sent. If the answer is No, then the process goes back to the beginning. If the answer is Yes, then the browser determines in Step S2 whether this particular web page that has been requested has been visited before. This is possible since web browsers typically keep records of the web sites that have been requested. If the particular page has not been visited in the past, then the page's URL information is sent to a Page Coordinate Server in Step S3. In Step S4 it is determined whether the relative display parameters, which may include zoom level, initial screen coordinates and text size, are available for the particular URL. If the answer is No, then in Step S5, the browser sets the display parameters to predetermined default values and accordingly displays the requested page in Step S7. However, if the display parameters of the requested page are found, then in Step S6, the browser sets the value of the parameters equal to the values found and displays the page accordingly in Step S7.

On the other hand, if the particular page has been visited before by any user of the server, then a set of the appropriate display parameters associated with the particular page is retrieved from a history file residing in the remote server in Step S11. Subsequently, this set of parameters is sent back to the browser and the page is displayed accordingly in Step S7. This allows the user to benefit from past preferences set by other users who have visited the same page previously.

Following the display of the requested page, the user may or may not adjust the settings in a Step S8. If the settings are maintained unchanged for a predetermined time period, then it is assumed that these are the desired settings and the process goes back to the beginning for the request of a new page. However, if the user is not satisfied with the chosen settings and changes them, then in Step S9 the new parameters are saved in the history file for future reference by that (or other) user, are sent to the Page Coordinate server for updating in Step S10, and the process returns back to the beginning.

The remote server, for example, the Nintendo server receives various incoming requests in Step S12. In Step S13, the server determines whether the received request is for fetching a page. If the answer is Yes, then it is determined in Step S14 whether the URL of the page is in the database. If the page's URL cannot be found, then a message "unknown URL" is sent to the user in Step S15 and the process goes back to the beginning. On the other hand, if the URL is found, then the server obtains the version of this URL that is flagged as having the most common parameter settings in Step S16, and sends these parameters to the user machine in Step S17 and the process goes back to the beginning.

If the received request is not for fetching a web page, then the server determines in Step S18 whether the request is for posting data related to the display parameters of a page. If the answer is No, then the process goes back to the beginning. However, if the answer is Yes, then the server saves the received parameters in Step S19, and subsequently determines what constitutes the most common parameter setting for the particular page in Step S20.

Once the server determines the most common setting, it inquires whether a flag has already been set indicating that the received setting is the most common in Step S21. If such a flag has already been set, then the process goes back to the beginning. On the other hand, if a flag indicating that the received set of parameters is the most common has not been set, then the flag corresponding to the set of parameters currently indicated as the most common is cleared in Step S22, a flag is set for the new set of parameters in Step S23, and the process returns to the beginning.

The history file may be located in the central server, as discussed above. However, in other exemplary embodiments, the history file may be stored locally, e.g., at the user's platform. In either case, the history file can contain the user's personal settings as well as settings of other users who have already visited the page.

Even though the above discussion has been focused on web browsers that are operable in conjunction with a Nintendo's Wii game console, other game platforms, for example, Nintendo's DS game platform may be used. In addition, the disclosed web browsing method may used with non-computer-based devices, including GPS devices, cell phones, PDA devices, etc. The web browsing service may be used with any platform that has an embedded browser environment.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

I claim:

1. A method for browsing pages using a remote page coordinate server device to set viewing parameters for viewing pages served by other remote page server devices, comprising:

receiving, with a remote page coordinate server device over a communications network, information from users indicating how the users control their respective display appliances to tailor presentation of a particular page served by a remote page server device different from the page coordinate server device;

determining, with the page coordinate server device in response to the received information, user-tailored presentation parameters the users use to tailor presentation of said particular page for better viewing, the determined user-tailored presentation parameters including zoom level and screen coordinates;

storing in the page coordinate server device, information about said user-tailored presentation parameters including zoom level and screen coordinates;

receiving, with the page coordinate server device, information indicating a request for the page server device different from the page coordinate server device to serve said particular page; and sending the stored user-tailored presentation parameters including zoom level and screen coordinates from the page coordinate server device to a further display appliance to enable a further display appliance to automatically tailor presentation of the particular served page according to the sent presentation parameters without requiring the served page content to be altered.

2. A method as in claim 1 wherein said computer page coordinate server device is used by the multiple users to access the other page server devices, said multiple users each using a comparable viewing platform display appliance, and said page coordinate server device applies initial presentation preferences set by one user for use by all users.

3. An Internet browsing system comprising:

a remote page coordinate server device connected to the Internet;

a plurality of Internet browsing appliances capable of each being connected to said page coordinate server device and to further remote page server devices different from the page coordinate server device, said plurality of Internet browsing appliances each initiating access of the further page server devices but also informing said page coordinate server device of said requested accesses, said plurality of browsing appliances sharing common specialized browser viewing characteristics that affect the way said page is presented to users; and a storage device coupled to said page coordinate server device, said storage device storing user browser presentation preferences derived from a first user browsing a particular web page served by a remote page server device different from the page coordinate server device; and a transmitter coupled to the page coordinate server device that sends the stored user browser presentation preferences derived from a first user browsing a particular web page to a further, different user browsing said same web page to enable a browsing appliance associated with the further user to automatically apply the user browser presentation preferences without requiring alteration of the web page.

4. The system as in claim 3 wherein said appliances comprise videogame systems.

5. The system as in claim 3 wherein said appliances comprise handheld videogame players including touch screens.

6. The system as in claim 3 said appliances comprise home videogame consoles.

7. The system as in claim 3 wherein said preferences include zoom level.

8. The system as in claim 3 wherein said preferences include screen coordinates.

9. The system as in claim 3 wherein said preferences include text size.

10. A method of viewing a page available on a network comprising:

permitting, using a computer processor, a first user to access a page served by a remote page server device over a network with a videogame playing device;

determining, using a remote page coordinate server device different from the page server device, whether the first user customizes presentation preferences including zoom level and display coordinates for viewing said page;

storing determined customized first user preferences remotely to the first user;

wherein when a second user different from the first user accesses said page using the same type of videogame playing device; the page coordinate server device retrieves said stored customized first user preferences and sends said customized first user preferences structured to automatically enable application by the same type of videogame playing device of said stored customized first user preferences to subsequent presentation and viewing of the page without requiring the content of the served page to be altered to thereby enable the second user to benefit from past preferences set by the first user when the first user previously visited the same page.

11. The method of claim 1 further including the page coordinate server device determining whether the requested page is within a database, and if the URL is found to be within the database, the server device determines the version of the page having the most common presentation parameter settings and sends those presentation parameter settings.

12. The method of claim 1 further including allowing a user to retrieve from the page coordinate server device, customized presentation settings that the user previously applied.

* * * * *